United States Patent [19]

Haak

[11] 4,062,979

[45] Dec. 13, 1977

[54] SPRAY DRIED MUSTARD FLOUR

[75] Inventor: Mark P. Haak, Shrewsbury, Pa.

[73] Assignee: McCormick & Company, Incorporated, Hunt Valley, Md.

[21] Appl. No.: 601,439

[22] Filed: Aug. 1, 1975

[51] Int. Cl.² .............................................. A23L 1/225
[52] U.S. Cl. ........................................ 426/44; 426/61; 426/533; 426/629; 426/638; 426/650; 426/460
[58] Field of Search .................... 426/44, 49, 61, 533, 426/605, 629, 638, 650, 460, 463, 461, 471, 507; 424/236

[56] References Cited

U.S. PATENT DOCUMENTS

| 2,760,869 | 8/1956 | Yanick | 426/61 |
| 2,893,874 | 7/1959 | Le Baron | 426/605 X |
| 2,940,860 | 6/1960 | Sarett | 426/61 X |
| 2,987,399 | 6/1961 | Goering | 426/507 X |
| 3,151,988 | 10/1964 | Rasmussen | 426/332 |
| 3,542,565 | 11/1970 | Stauffer | 426/605 |
| 3,574,640 | 4/1971 | Dougherty, Jr. | 426/455 |
| 3,594,181 | 7/1971 | Alpin | 426/21 X |

Primary Examiner—Raymond N. Jones
Assistant Examiner—R. A. Yoncoskie
Attorney, Agent, or Firm—Cushman, Darby & Cushman

[57] ABSTRACT

A mustard flour of controlled pungency is obtained by mixing separately prepared mustard flours. A first mustard flour is prepared wherein the enzyme is deactivated but the glucoside is retained, whereas in a second mustard flour the enzyme is retained but the glucoside is substantially eliminated. Both mustard flours, alone, are mild in flavor.

37 Claims, 1 Drawing Figure

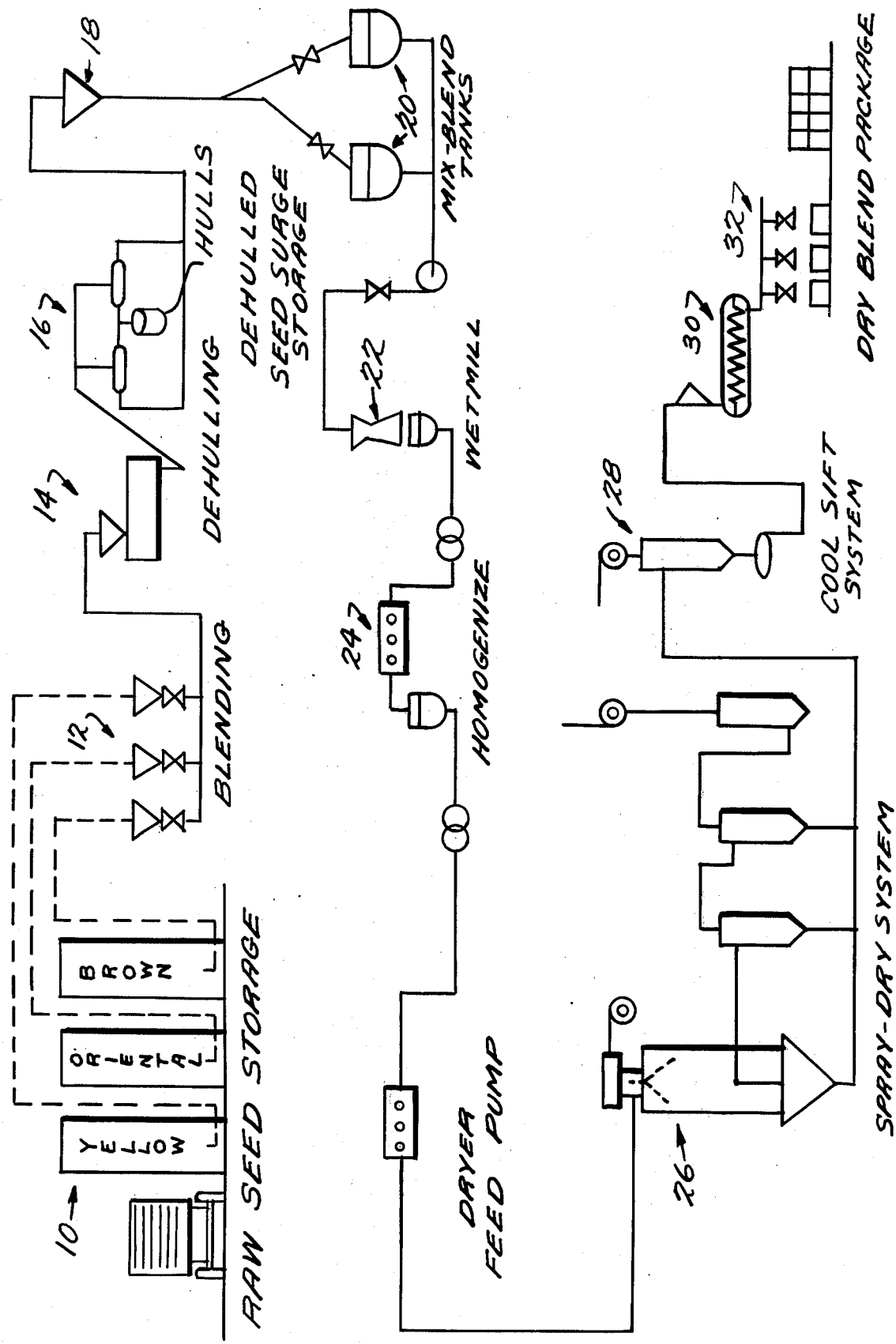

SPRAY DRIED MUSTARD FLOUR

BACKGROUND OF THE INVENTION

Mustard, any of several herbs of the genus Brasica, when ground, yields mustard flour.

The present mustard flour of commerce is produced by aging mustard seeds until they become firm, dehulling and then dry grinding the seeds. About 20 percent of the weight of the seeds is lost in the dehulling process. Dry grinding proceeds in much the same manner as is the case for the production of wheat flour. Accordingly, much classifying, screening and recycling is necessary. Several people on the production line are wholly occupied in the cleaning of sifters whose screen openings have become blinded by caking of the product thereon. Because the amount of screen cleaning that is needed is proportional to the output, an increase in production requires an increase in man-hours of work. Although the theoretical yield of dry ground mustard flour is near 80 percent, losses in processing often lower the actual yield to about 65 percent.

Presently, the mustard flour produced from yellow mustard seed sells for a higher price than the mustard flour produced from oriental mustard seed, because of the lower yield (and resulting higher cost per pound) of yellow mustard seed per acre. However, the flour produced from yellow mustard seed, when used as a mayonnaise or processed meat ingredient, is milder in flavor. When used in mayonnaise, a higher viscosity product is obtained. Accordingly, manufacturers of these products primarily use the higher priced flour made from yellow mustard seed. Brown mustard seed is also used to produce mustard flour and prepared mustard products.

When water is added to dry ground mustard flour, an enzyme, myrosin, catalyzes a glucoside, e.g., sinigrin to produce a volatile, pungent oil, principally allyl isothiocyanate. If the enzyme is destroyed before the flour is hydrated, a bland product is produced, which has found use in the food processing industry as a binder and emulsifier, for instance in frankfurters.

The following United States patents exemplify the state of the mustard flour art.

| Patentee | Pat. No. | Issue Date |
| --- | --- | --- |
| Klint | 2,239,563 | April 22, 1941 |
| Musher | 2,246,528 | June 24, 1941 |
| Schlenk et al | 2,827,452 | March , 1958 |
| Goering | 2,987,399 | June 6, 1961 |
| Ferguson, Jr. | 3,007,799 | November 7, 1961 |
| Ettlinger | 3,146,227 | August 25, 1964 |
| Rasmussen | 3,151,988 | October 6, 1964 |
| Dougherty, Jr. | 3,574,640 | April 13, 1971 |
| Peterson | 3,652,297 | March 28, 1972 |

The U.S. Pat. of Durst No. 3,788,861, issued Jan. 29, 1974, while not relating to mustard flour, contains an extensive bibliography on the art of wet grinding of seeds to produce flour.

SUMMARY OF THE INVENTION

Mustard seed, dehulled or not and fresh or aged, is mixed with water to produce a slurry which is wet milled and spray dried to produce mustard flour. When hot water is used to produce the slurry, an enzyme is deactivated, and the flour contains a characteristic glucoside. When cold water is used to produce the slurry, the enzyme splits the glucoside and produces a pungent volatile oil that is driven off in the spray drying step, but the enzyme survives in the mustard flour. Both mustard flours, alone, are mild in flavor. When the two are blended and mixed with water, the enzyme in one splits the glucoside in the other producing the pungent flavoring oil. Thus the degree of mildness versus pungency of a mustard product can be predetermined by blending the two flours.

Spray dried mustard flour is an excellent emulsifier for mayonnaise, and may be increased in proportion and egg yolk content reduced, with a wholly satisfactory emulsification, viscosity and flavor being obtained. Alternatively, the proportion of mustard flour may be reduced and egg yolk content maintained when spray dried mustard flour is used, again with wholly satisfactory emulsification, viscosity and flavor being obtained.

The flour products are not limited to use in mayonnaise, but may also be used in processed meats, in breading and in dough, for example.

The principles of the invention will be further discussed with reference to the drawing wherein a preferred embodiment is shown. The specifics illustrated in the drawing are intended to exemplify, rather than limit, aspects of the invention as defined in the claims.

BRIEF DESCRIPTION OF THE DRAWING

The FIGURE is a schematic flow diagram of a process in accordance with the principles of the invention.

DETAILED DESCRIPTION

In a preferred embodiment of the invention, raw mustard seed is withdrawn from storage 10 and blended at 12. The seed is dehulled at 14 and the dehulled seed and hulls are separated from one another at 16. The dehulled seed is stored at 18 until it is forwarded to mixing and blending tanks at 20 where water is added to create a slurry. The slurry is pumped to a wet mill 22 where wet grinding takes place. The slurry of wet ground seed is pumped to a homogenizer 24 and, following homogenization, to a spray dryer 26. The dried mustard flour is cooled and sifted at 28, then dry blended and packaged at 30, 32.

The items of equipment used in carrying out the process are all commercially available. Although the process may be run batch-wise, and the time required to process a particular quanta of seed is dependent on how continuously the steps are run and upon the capacity of the various vessels and tanks, a typical system, run continuously, can process a seed from storage at 10 into spray dried flour and to packaging at 32 in ten minutes.

The flow chart of the drawing depicts several instances where blending may occur. Not all of these need be used in any particular practice of the invention. For instance, the blending step at 12 is employed to blend fresh seed with aged seed, and/or to blend yellow, brown and/or oriental seed together in any desired ratio. If only one kind of mustard seed is being used, this step is not needed. If desired, different kinds of seed may be withdrawn from storage at 10 and dehulled one kind at a time, with blending of the dehulled seed occurring at 20. Similarly, although one processing line is shown extending from the slurry formation at 20 to the dry blending step at 30, the portion from 20 to 26 or 28 may be duplicated to provide separate lines for hot water slurry processing and cold water slurry processing. In one such variation, the output of the two wet grinders 22 and homogenizers 24 may feed the sprayers of the same spray drying tower. In such a case the blending step shown conducted at 30 is not needed, since blending is actually conducted at 26 as the particles intermix in the dryer. A similar result is achieved if the parallel slurry feed lines combine through a proportioning valve just before the spray dryer.

The dry blending step at 30 is primarily intended for intermixing mustard flour spray dried from a hot water slurry with mustard flour spray dried from a cold water slurry, in desired proportions. However, this blending step may also be used to intermix mustard flour produced from different kinds of mustard seed, or to mix any other ingredients with the product prior to packaging. Various "custom" blends may be achieved in this manner, to adjust the flavor, blandness pungency, color, degree of "nose heat" versus degree of "throat heat" of the product or to predetermine the viscosity or stability of prepared foods in which the product is to be incorporated, such as mayonnaise, salad dressing, frankfurters, breading batter, dough and the like. Blending may also be used to make the most of any available economic advantages, for instance to maximize or minimize the weight or bulk of the product needed to achieve a desired effect, such as flavoring, emulsification, thickening or binding, in dependence upon a customer's requirements or indifferences. For example, mayonnaise in the United States in thought of as a creamy, very light yellow product which would be avoided by many consumers were it seen to contain specks, e.g., of mustard flour from whole brown or oriental mustard seed, and/or of black pepper. In other countries, and perhaps in some regions of the United States, consumers relish the taste of a good mayonnaise without regard to the appearance specks or spice therein.

About twenty percent of the weight of the in-bound mustard seed is hulls; about 6–10 percent of the weight of the in-bound mustard seed is moisture. The mustard flour product typically is dried to about 2–6 percent moisture content, preferably, to about 4 percent. The present mustard flour of commerce is the dry ground product of dehulled mustard seed; typically much of the inbound product is lost in the classification and sieving steps of the dry grinding process. Whereas the theoretical yield in the presently used dry grinding process is about 80 percent, the actual yield is oftener between 65 and 70 percent, an actual yield of 78–92 percent may be achieved when using the process of the invention primarily depending on whether the seed is dehulled and the initial and final moisture contents since very little is lost in classifying.

At the slurry mixing step 20, the amount of the water added depends on seed variety, slurry pumpability, spraying tower design and fuel costs. The temperature of the water added depends on whether and to what extent the enzyme is to be deactivated or permitted to catalyze reaction of the glucoside to produce volatile pungent oil prior to the drying step. If the volatile oil is produced prior to drying, most of it (e.g., up to 95 percent) is driven off in the spray drying step so that the resulting product may be mild. The enzyme survives the cold water treatment and drying. The less water added at 20, the harder the slurry is to pump and to spray, but the greater is the capacity of the spray drier; using more water aids pumping and spraying, but calls for more fuel use in the drying step. Typically, the mustard seed slurry contains 2–28 percent solids.

For hot water slurry, to produce enzyme-deactivated spray dried mustard flour, water at 140° F (60° C) to 230° F (110° C) is preferably used. Hotter water could be used, but at the increasing result of denaturation of the protein. For cold water slurry to produce enzyme-active, spray dried mustard flour, water at 30°F (−1° C) to 130° F (54.4° C) is preferably used. In the case of cold water processing, chillers may be used between wet grinding and homogenizing and/or between homogenizing and spray drying to subtract the heat added as a result of the respective immediately preceding steps, so that more of the enzyme survives in the spray dried flour.

The wet milling step may be conducted by a conventional wet mill that is conventionally used for grinding other seeds, e.g., see the Durst patent mentioned above. In the grinding of other seeds, this apparatus is sometimes called a "wet stone mill" and the product called "wet stone ground."

In theory, the homogenizing step could be omitted, but in practice, that would be at the expense of producing a slurry that was more difficult to spray dry and a product that was stickier and harder to hydrate. The homogenizer 24 is typically of the sort used for homogenizing whole milk and may be operated at 500–6000 p.s.i. This step physically reduces the fat globules and results in there being less surface fat on the spray dried product. In addition, the product spray dried from a homogenized slurry has more consistency of body, smoother texture and is more flowable and wettable.

The spray dryer 26 may be of the same sort as is commercially used to dry eggs, milk, instant coffee, detergent and the like. An inlet air temperature of 250° F – 700° F may be used, a temperature of about 500° F and a contact time of 10 seconds or less being preferred. The outlet temperature is preferably about 150° F – 220° F. Turbulence and interparticle collisions during drying serve to agglomerate the particles. The resulting spray dried mustard flour product is typically constituted by 50 micron spheres each including about 50 wet milled mustard flour particles.

Whereas in dry milling, classifying and sifting form a major part of the process with generally more recycling of overflow than passing of underflow and accompanied by much tending and cleaning of screens, in wet milling classifying is a minor step in which practically all of the product is found to be of acceptable size on a single pass. Classification tends to reduce larger agglomerates formed in the spray drying process.

It is estimated that the process of the invention may be run by 1 or 2 people, whether 100 pounds per hour or 2000 pounds per hour are being manufactured. The conventional mustard flour process requires about 5 people in low quantity production, with more people needed, in proportion, to expand output, largely due to classification and screening needs.

Accordingly, spray dried mustard flour may be made from each of the several varieties of mustard seed, e.g., yellow, brown and oriental, and blends thereof, whole or dehulled, and substantially fully or partially enzyme deactivated (hot water processed) or substantially fully or partially enzyme active, but with the pungent volatile oil that is generated in wet grinding mostly driven off in the spray drying step (cold water processed) and blends therebetween, each blend giving specific results in end product usage.

As previously mentioned, were there a desired or purpose, the product produced in accordance of the invention may be dry blended with other materials prior to packaging. These other materials could include ground spices, herbs, other flours, seasonings, even dry ground mustard flour, in any combinations and proportions.

Several examples are provided hereinbelow to illustrate some characteristics and uses found for the spray dried mustard flour of the invention.

EXAMPLE I

Three samples of spray dried mustard flour and one sample of conventionally dry ground mustard flour were manufactured and used at the same concentration (weight percent) in a standard mayonnaise recipe. Viscosity of the mayonnaise was tested with a Brookfied viscosimeter immediately following mixing, four weeks after the three months after mixing. Samples of the same mustard flours were also tested for volatile oil content.

The standard mayonnaise recipe is as follows:

| Ingredient | Weight Percent |
|---|---|
| 10 percent salt egg yolk | 7.00 |
| Soy oil | 80.50 |
| Sugar | 2.00 |
| Salt | 0.50 |
| Mustard flour | 0.50 |
| Vinegar | 3.30 |
| Water | 6.20 |
| | 100.00 |

(This is a typical standard recipe. There are others, e.g., which vary slightly in proportion or substitute equivalent ingredients. For instance, some recipes use other salad oils than soy, in some the water is already present as a diluent in the vinegar and in others some or all of the vinegar is replaced by lemon juice. Sugar can be replaced by other sweeteners. In any event, mayonnaise is one of those products for which the U.S. F.D.A. maintains a standard product definition, i.e., a published list and ranges of permissible ingredients. Thus, it is highly proper to refer to a "conventional" or "standard" mayonnaise recipe.)

The test results are tabulated as follows:

| COMPARISON OF MAYONNAISE VISCOSITIES AS AFFECTED BY VARIOUS MUSTARD FLOURS | | | | | |
|---|---|---|---|---|---|
| Mustard Seed | | Volatile | Mayonnaise Viscosity (expressed in 1000 cps) | | |
| Blend | Process | Oil | IMMED. | 4 WKS. | 3 MOS. |
| 60% Oriental 40% Yellow (dehulled seeds) | 85 water, 15 seed, both heated to 200° F, wet-grind, homogenized, spray-dried. | 0.45% | 303 | 292 | 285 |
| 70% Oriental 30% Yellow (whole seeds) | 80 water, 20 seed Oriental heated, wet-grind, spray-dried. Yellow was processed cold. | 0.67% | 284 | 230 | 196 |
| 30% Oriental 70% Yellow (whole seeds) | 80 water, 20 seed, both heated to 200° F, wet ground, homogenized, spray-dried | 0.07% | 291 | 257 | 238 |
| 50% Oriental 50% Yellow (dehulled seeds) | Roller Ground Control. This is regular mustard flour of commerce. | 0.49% | 237 | 148 (5 wks) | 130 |

EXAMPLE II

To examine flours prepared from the same varieties of seed, a similar test was conducted pairing: "A," a mustard flour prepared from 75% heated and 25% unheated, 50% yellow, 50% oriental, dehulled, undried, fresh crop mustard seed, wet stone milled, spray dried, ribbon blended and sieved through a b20 Tuftex screen, with "B," a mustard flour conventionally prepared from dehulled 50% yellow, 50% oriental mustard seed, roller milled and sieved. The results are tabulated as follows:

| | A | B |
|---|---|---|
| Color | Light Yellow | Yellow |
| Odor | Cooked | Normal |
| Taste | Grainy | Normal |
| Puddling | Acceptable | Acceptable |
| Speck Test | Acceptable | Acceptable |
| Volatile Oil | 0.45 | 0.58 |
| Non-Volatile Oil | 34.26 | 41.02 |
| Protein | 33.05 | 31.30 |
| Moisture | 2.80 | 2.80 |
| Ash | 3.43 | 3.79 |
| Granulation (U.S. sieve) | | |
| +50 | 0.0 | 0.0 |
| −50 + 70 | 5.0 | 5.0 |
| −70 + 100 | 5.0 | 27.5 |
| −100 + 200 | 70.0 | 37.5 |
| −200 + 230 | 2.5 | 17.5 |
| −230 | 17.5 | 12.5 |

The two flours were made into mayonnaise, using the formula given in Example I (7.50% salt yolk, 0.5% mustard flour). The viscosities were tested and are tabulated as follows:

| Viscosities (1000 cps) Sample | Immed. | 24 hrs. | 1 wk. | 2 wks. | 3 wks. | 4 wks. | 3 mos. |
|---|---|---|---|---|---|---|---|
| Premixer System | | | | | | | |
| A | NA | 182 | 167 | 173 | 164 | 175 | 145 |
| B | NA | 178 | 170 | 160 | 146 | 145 | 113 |
| Continuous System | | | | | | | |
| A | 233 | 190 | 187 | 186 | 176 | 168 | 138 |
| B | 202 | 168 | 163 | 144 | 142 | 131 | 96 |

EXAMPLE III

To examine the possibilities of (1) reducing the amount of mustard flour without adversely affecting flavor, and (2) maintaining the standard recipe amount of mustard, but reducing the amount of egg yolk without adversely affecting the viscosity of the mayonnaise. In the following tabulation, the "A" samples of mayonnaise were prepared using spray dried mustard flours blended from 75% oriental whole seed, hot processed, with 25% yellow whole seed, cold processed. The "B" sample was prepared conventionally, as in Example II, as a control

| | | Viscosity (1000 cps) | | | | |
|---|---|---|---|---|---|---|
| | Variation from Standard Recipe | Immed. | 24 hrs. | 1 wk. | 3 wks. | 4 wks. |
| A1 | None | 242 | 193 | 199 | 197 | 190 |
| B | None | 217 | 193 | 188 | 174 | 170 |
| A2 | −0.13% mustard, +0.13% Water | 235 | 173 | 185 | 184 | 188 |
| A3 | −0.5% yolk, +0.5% water | 204 | 162 | 152 | 155 | 147 |
| A4 | +0.5% mustard, −0.79% yolk, +0.29% water | 235 | 185 | 184 | 176 | 168 |

These samples were panel tested to the following effects. In the manufacture of mayonnaise, spray dried mustard flour is interchangeable with conventional dry ground mustard flour in virtually all respects. In addition, it is possible to reduce the mustard level in the standard recipe by 25 percent without adversely affecting either the flavor or the viscosity of the mayonnaise. Moreover, by maintaining the standard recipe level of 0.5% mustard, it is possible to reduce the egg yolk content by 7.5% without adversely affecting the viscosity of the mayonnaise. Thus, for the mayonnaise manufacturer, use of the spray dried mustard flour product of the invention can produce a savings in mustard cost, or a saving in egg yolk cost, and can permit some variation in the standard recipe to allow the manufacturer to take advantage of shifts in the relative pricing of these ingredients.

Because of the relative recentness and surprising nature of the invention and the commercial importance it bears to manufacture of mayonnaise, it has been primarily studied in relation to mayonnaise, so far. However, as related at the outset, the product is believed to have wider utility, e.g., in the manufacture of frankfurters, sausages and other processed meats, in batters such as breading and in bakery dough products, such as bread. Although these and other uses remain to be more fully explored, some surprising results have already been obtained. For instance, for reasons not completely understood by the present inventor, when conventional mustard flour is added to breading batter the period within which the batter must be used is shortened. This has limited the use of mustard flour as a breading batter ingredient and has cost food processors the value of the remainder of batches of batter which broke down before they could be used up. When spray dried mustard flour is substituted in the batter recipe, the batter does not break down and, generally can be completely used.

A number of "imitation mayonnaise" products are currently being marketed. The mustard flour products of the invention can be used as an ingredient thereof, as well as in salad dressing, horseradish cream and other salad creams constituted by a semi-solid or thick liquid salad oil emulsion.

When either the hot processed or cold processed, spray dried mustard flour is used alone as a prepared food ingredient, it may function as a relatively flavorless binder, emulsifier and/or extender. Accordingly, relatively bland versions of the flour may be used in shaped and formed meat choppetes, breaded cutlets, fish cakes, T.V.P., soybean meal and other meat-containing or meat-substitute blocks, patties and the like, as an ingredient of the core or as an ingredient of the breading or other coating. Furthermore, the flour of the invention may be used in bread, rolls, crusts, and in glazes therefor, and in stuffings and similar products.

Although the flour of the invention may be used in the production of "prepared" i.e., table mustard, and in similar products where the flavor and color of mustard are most important, conventional mustard flour is presently considered more highly flavored and brightly colored per unit quantity. Accordingly, the product of the invention is more likely to find widest use in prepared foods where the characteristics in which it excels are wanted.

Although it is contemplated the mustard flour product of the invention will be pre-blended by its manufacturer, before it is supplied to an industrial user, e.g., a mayonnaise manufacturer, it is apparent the mustard flour components may be separately packaged, to be blended by the user. The latter procedure would find use, for instance, in a new product development or testing program of the industrial user, in which the industrial user may wish to try several blends before settling upon one or more particular blends.

It should now be apparent that the mustard flour as described hereinabove possesses each of the attributes set forth in the specification under the heading "Summary of the Invention" hereinbefore. Because the mustard flour of the invention can be modified to some extent without departing from the principles of the invention as they have been outlined and explained in this specification, the present invention should be understood as encompassing all such modifications as are within the spirit and scope of the following claims.

What is claimed is:

1. A process for manufacturing mustard flour having a selected degree of pungency versus blandness upon hydration from mustard seed which is known to naturally contain a glucoside and an enzyme which catalyzes a reaction of the glucoside, in the presence of water, to produce a volatile pungent oil, said process comprising:
   a. grinding a first quanta of mustard seed, hydrating this first quanta and heating it sufficiently to disable substantially all of said enzyme contained therein;
   b. drying the hydrated first quanta in a heated gas stream to produce a first mustard flour product, which, if re-hydrated alone, is relatively bland due to the disabling of said enzyme;
   c. grinding a second quanta of mustard seed;
   d. hydrating the ground second quanta sufficiently to produce said reaction therein to produce at least some of the volatile pungent oil potentially producible therein;
   e. drying the hydrated second quanta in contact with a heated gas stream, to produce a second mustard flour product, which, if hydrated alone is relatively bland due to the evaporation therefrom during drying of at least a substantial proportion of said volatile oil therefrom;

f. step (d) being carried out at such a cool temperature and step (e) being carried out for such a short time, that a substantial proportion of said enzyme originally present in the second quanta of mustard seed survives in the second mustard flour product; and g. blending the first mustard flour product with the second mustard flour product to produce a resulting mustard flour product whose characteristic degree of pungency upon hydration is substantially affected by how much of said glucoside of the first mustard flour product is available for producing said reaction, catalyzed by said enzyme of the second mustard flour product.

2. The process of claim 1, wherein:
each quanta of mustard seed is constituted by seed of at least one of the varieties: yellow mustard seed, oriental mustard seed and brown mustard seed.

3. The process of claim 1, wherein:
the first quanta of mustard seed is wet ground as a slurry of mustard seed and water in the performance of said grinding thereof; and
the process further including:
drying the wet ground mustard seed to about 2 percent to about 6 percent moisture content to provide said first mustard flour product.

4. The process of claim 3, wherein:
the slurry contains from about 2 percent to about 28 percent mustard seed, by weight.

5. The process of claim 3, wherein:
the slurry is formed with water having a temperature of from about 140° F (60° C) to about 230° F (110° C), and the heat in this water performs said heating step.

6. The process of claim 3, wherein:
the drying of the wet ground mustard seed is carried out by spraying the slurry of wet ground mustard seed into a moving stream of heated air, then recovering the first mustard flour product from the heated air.

7. The process of claim 6 wherein:
the heated air initially has a temperature of from about 250° F to about 700° F and a final temperature of from about 150° F to about 220° F, when in contact with the wet ground mustard seed.

8. The process of claim 7, wherein:
the duration of contact between the wet ground mustard seed and the heated air is less than 10 seconds.

9. The process of claim 6, wherein:
each quanta of mustard seed is constituted by seed of at least one of the varieties: yellow mustard seed, oriental mustard seed and brown mustard seed.

10. The process of claim 3, wherein:
steps (c) and (d) are carried out by forming a slurry of the second quanta of mustard seed in water and wet grinding this slurry.

11. The process of claim 10, wherein:
the slurry of the second quanta of mustard seed in water contains from about 2 percent to about 28 percent mustard seed, by weight.

12. The process of claim 10, wherein:
the slurry of the second quanta of mustard seed in water is formed with water having a temperature of from about 30° F (−1° C) to about 130° F (54.4° C).

13. The process of claim 10, wherein:
the drying of the second quanta of wet ground mustard seed is carried out by spraying the second quanta of wet ground mustard seed into a moving stream of heated air, then recovering the second mustard flour product from the heated air.

14. The process of claim 13, wherein:
the heated air into which the second quanta of wet ground mustard seed is sprayed initially has a temperature of from about 250° F to about 700° F and a final temperature of from about 150° to about 220° F, when in contact with the second quanta of wet ground mustard seed.

15. The process of claim 14, wherein:
the duration of contact between the second quanta of wet ground mustard seed and the heated air is less than 10 seconds.

16. The process of claim 13, wherein the slurry of the wet ground first quanta of mustard seed is combined with the wet ground second quanta of mustard seed as the spray drying thereof is initiated; and
wherein the first and second mustard flour products are recovered commingled together from the heated air stream, whereby said blending step (g) is conducted during the spray drying step.

17. The process of claim 10, wherein:
each quanta of mustard seed is constituted by seed of at least one of the varieties: yellow mustard seed, oriental mustard seed and brown mustard seed.

18. The process of claim 13, wherein:
the drying of the slurry of the wet ground first quanta of mustard seed in water is carried out by spray drying this slurry in a moving stream of heated air, then recovering the first mustard flour product from this moving stream of heated air.

19. The process of claim 18, further comprising:
intermediate the steps of wet grinding the first quanta of mustard seed and spray drying the slurry of the wet ground first quanta of mustard seed,
homogenizing the slurry of the wet ground first quanta of mustard seed, to physically reduce globules of fat naturally occurring therein.

20. The process of claim 18, further comprising:
intermediate the steps of wet grinding the second quanta of mustard seed and spray drying the slurry of the wet ground second quanta of mustard seed,
homogenizing the slurry of the wet ground second quanta of mustard seed, to physically reduce globules of fat naturally occuring therein.

21. The process of claim 20, further comprising:
intermediate the steps of wet grinding the first quanta of mustard seed and spray dyring the slurry of the wet ground first quanta of mustard seed,
homogenizing the slurry of the wet ground first quanta of mustard seed, to physically reduce globules of fat naturally occurring therein.

22. The process of claim 21 wherein:
each quanta of mustard seed is constituted by seed of at least one of the varieties: yellow mustard seed, oriental mustard seed and brown mustard seed.

23. The process of claim 1, further comprising:
screening the first and second mustard flour products to eliminate oversize particles therefrom.

24. The process of claim 23, wherein:
the screening step is conducted prior to the blending step.

25. The process of claim 23, wherein:
the screening step is conducted subsequent to the blending step.

26. The process of claim 1, further comprising: packaging the first and second mustard flour products separately, then withdrawing the first and second mustard flour products from the packaging for blending them together.

27. The process of claim 1, further comprising: packaging the blended, resulting mustard flour product.

28. A mustard flour product having a selected degree of pungency versus blandness upon hydration, consisting essentially of a blend of:
 a. a first mustard flour in which substantially all of the naturally occurring enzyme in mustard seed which catalyzes the known reaction of naturally occurring glucoside in mustard seed, upon hydration, to produce a volatile pungent oil, is disabled, so that the first mustard flour, if hydrated alone, is relatively bland; and
 b. a second mustard flour in which a substantial proportion of said enzyme survives, but from which at least some of the volatile pungent oil potentially producible in the second mustard flour upon hydration is missing, having been formed and removed, so that the second mustard flour, if hydrated alone is relatively bland.

29. The mustard flour product of claim 28, wherein: the first mustard flour is present as spray dried agglomerates.

30. The mustard flour product of claim 29, wherein: the second mustard flour is present as spray dried agglomerates.

31. The mustard flour product of claim 28, wherein: the second mustard flour is present as spray dried agglomerates.

32. The mustard flour product of claim 28, wherein: the first and second mustard flour are each constituted by ground seed of at least one of the varieties yellow mustard seed, oriental mustard seed and brown mustard seed.

33. The mustard flour product of claim 32, wherein: at least one of said first and second mustard flour incorporates as ground material a substantial proportion of the hulls of said at least one variety of ground seed.

34. A process for producing a mustard flour product having a selected degree of pungency versus blandness upon hydration, comprising:
 preparing
 a. a first mustard flour in which substantially all of the naturally occurring enzyme in mustard seed which catalyzes the known reaction of naturally occurring glucoside in mustard seed, upon hydration, to produce a volatile pungent oil, is disabled, so that the first mustard flour, if hydrated alone, is relatively bland; and
 b. a second mustard flour in which a substantial proportion of said enzyme survives, but from which at least some of the volatile pungent oil potentially producible in the second mustard flour upon hydration is missing, having been formed and removed, so that the second mustard flour, if hydrated alone is relatively bland; and
 blending the first and second mustard flours together.

35. The process of claim 34, further comprising: hydrating the blended first and second mustard flours.

36. The process of claim 35, wherein: the hydrating step is conducted by mixing the blended first and second mustard flours into a water-containing food.

37. The process of claim 34 wherein at least one of the mustard flours is prepared from mustard seed comprised of fresh, unaged mustard seed.

* * * * *